(12) United States Patent
Matsuura

(10) Patent No.: US 7,046,684 B2
(45) Date of Patent: May 16, 2006

(54) GATEWAY SYSTEM AND FAULT MANAGEMENT METHOD

(75) Inventor: Makoto Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 939 days.

(21) Appl. No.: 10/106,231

(22) Filed: Mar. 27, 2002

(65) Prior Publication Data

US 2002/0141562 A1 Oct. 3, 2002

(30) Foreign Application Priority Data

Mar. 28, 2001 (JP) ............................ 2001-091556

(51) Int. Cl.
*H04L 12/56* (2006.01)
(52) U.S. Cl. ..................... 370/401; 370/218; 379/88.17
(58) Field of Classification Search ................ 370/400, 370/401, 352–356, 389, 466, 467, 216, 217, 370/218; 379/88.17
See application file for complete search history.

(56) References Cited

U.S. PATENT DOCUMENTS

| 6,515,985 B1 * | 2/2003 | Shmulevich et al. ....... 370/356 |
| 2001/0049730 A1 | 12/2001 | Brendes et al. |

FOREIGN PATENT DOCUMENTS

| EP | 1 179 927 A2 | 2/2002 |
| JP | 60-41354 | 3/1985 |
| JP | 9-214545 | 8/1997 |
| JP | 3099794 | 8/1999 |
| JP | 11-284728 | 10/1999 |
| JP | 11-331269 | 11/1999 |
| JP | 2000-196664 | 7/2000 |
| JP | 2000-286897 | 10/2000 |
| WO | WO 00/35156 | 6/2000 |

OTHER PUBLICATIONS

Copy of reference retrieved from the Internet at: http://mirrors.isc.org/pub/www.watersprings/pub/id/draft-ietf-sigtran-m3ua.06.text.
Copy of Japanese Office Action dated Feb. 15, 2005 (and English translation of revelant portion).
New Zealand Examination Report dated Apr. 8, 2002.
See web site: http://www.trillium.com/assets/iplmcgp-magaco/datasheet/8712023.pdf. "Trillium Digital Systems' Gateway Control Protocol (GCP) Software Source Code Solutions," Trillium Digital Systems, an Intel Company.

* cited by examiner

*Primary Examiner*—John Pezzlo
(74) *Attorney, Agent, or Firm*—Dickstein, Shapiro, Morin & Oshinsky, LLP.

(57) ABSTRACT

A gateway system prevent an occurrence of a call loss and an inaccessibility of the SG and can effectively utilize communication lines, even if a fault occurs on the MGC side. In the gateway system, a PC is supplied to an SG connected to a plurality of MGCs, and an occurrence of a call loss and an inaccessibility of the SC can be prevented by incorporating to the SG a function that requires line close operation for an opposed node of the SCN when a fault occurs on the MGC which is structured to have no PC.

15 Claims, 12 Drawing Sheets

133

| MGC | MGC FAULT INFORMATION | LINE CLOSE INFORMATION |
|---|---|---|
| #1 | 0 | 0 |
| #2 | 1 | 0 |
| #3 | 1 | 1 |
| #4 | 0 | 0 |
| ⋮ | ⋮ | ⋮ |

FIG. 6

GATEWAY SYSTEM AND FAULT MANAGEMENT METHOD

BACKGROUND OF THE INVENTION

1. Field of the Invention

The invention relates to a gateway system and a fault management method used on the gateway system, in particular, to a fault management method in a media gateway controller included in the gateway system.

2. Description of the Related Art

Conventionally, in an SCN (Switched Circuit Network), a PC (Point Code) is assigned to each (signaling) point of the SCN, and the PC is utilized as an address used for routing of a signal message.

On the other hand, in a gateway system which provides an IP network service via the SCN a PC is assigned to each MGC (Media Gateway Controller).

However, in a conventional gateway system, a method of maintenance and charging of the system is complicated and extra PCs are wasted since PC is assigned to each MGC. To overcome the problem, one PC can be assigned to each SG (signaling gateway) which is connected to a plurality of MGCs. However, in this case, when one of MGCs which are connected to the same SG having a fault (trouble), for example, due to a fault occurred in a LAN (Local Area Network) or a fault of the MGC itself, a call loss may occur or the SG (or PC code) may become inaccessible.

SUMMARY OF THE INVENTION

Therefore, it is an object of the invention to provide a gateway system and a fault management method used in the system, which overcome the above mentioned problems.

Further, it is an object of the invention to provide a gateway system and a fault management method used in the system, which can prevent an occurrence of a call loss and an inaccessibility of the SG and can effectively utilize communication lines, even if a fault occurs on the MGC side.

According to a first aspect of the invention, there is provided a gateway system which provides an IP network service via an existing switched circuit network. The gateway system comprises (1) a media gateway which performs transformation of a media format required between the switched circuit network and an IP network, (2) a plurality of media gateway controllers each of which controls the media gateway and controls calls and connections of the IP network, and (3) a signaling gateway which performs signaling transfer between the switched circuit network and the IP network. Wherein, when a fault occurs on a media gateway controller side, the signaling gateway has a function to require an opposed node of the switched circuit network to perform a line close operation about lines controlled by the media gateway controller.

According to a second aspect of the invention, there is provided a fault management method of a gateway system which provides an IP network service via an existing switched circuit network. The fault management method comprises the steps of (1) performing, at a media gateway, transformation of a media format required between the switched circuit network and an IP network, (2) controlling, at each of a plurality of media gateway controllers, the media gateway, and calls and connections of the IP network, (3) performing, at a signaling gateway, signaling transfer between the switched circuit network and the IP network, and (4) requiring, at the signaling gateway, when a fault occurs on a media gateway controller side, an opposed node of the switched circuit network to perform a line close operation about lines controlled by the media gateway controller.

That is, according to a gateway system of the invention, in a gateway system providing an IP network service such as a RAS (Remote Access Service) or a VoIP (Voice over IP (Internet Protocol)) using an existing SCN, a PC (Point Code) is supplied to an SG (Signaling Gateway) connected to a plurality of MGCs (Media Gateway Controller), and an occurrence of a call loss and an inaccessibility of the SG can be prevented by incorporating to the SG a function that requires line close operation for an opposed node of the SCN when a fault (for example, a fault occurred in a LAN (Local Area Network) or a fault of the MGC itself) occurs on the MGC which is structured to have no PC.

In recent years, the Internet has been dramatically spread, consequently, a gateway system has been proposed which provides an IP network service through the SCN. The gateway system includes the SG which terminates a No. 7 signal and provides a signaling transfer function between the SCN and an IP (Internet Protocol) network, MGs (Media Gateway) each of which transforms required media data between the SCN and the IP network, and MGCs each of which controls the MG and controls calls and connection of the IP network.

In the SCN, a PC is assigned to each point and the PC is used as an address for routing of a signal message. On the other hand, in a gateway system providing an IP network service via the SCN, the PC is assigned to each MGC.

However, such the assignment of PC to the MGC of the IP network complicate a maintenance of the system and a charging system. Therefore, the PC is not assigned to each MGC, and the PC is assigned only to each SG which is connected to a plurality of MGCs. In this case, if the SG has no line state management function, when one of the MGCs which are connected to the same SG having a fault, a line which is controlled by another MGC connected to the SG may also become unavailable.

To overcome the above problem, according to the invention, a function is added to the SG. The function requires a line close operation about a line controlled by the MGC to an opposed node when a fault occurs on the MGC side. Thereby, lines which are controlled by the other MGCs (which are connected to the same SG as the MGC having a fault) are kept available to prevent an occurrence of a call loss and an inaccessibility of the SG.

Specifically, according to the gateway system of the invention, a plurality of MGCs are connected to an SG, a PC is assigned to the SG and does not assigned to the plurality of the MGCs.

The SG includes a No. 7 side signal processing unit, an IP side signal processing unit, and an MSG management unit. The No. 7 side signal processing unit has an MTP-L3 (Message Transfer Part-Level 3) function to terminate a No. 7 signal.

The IP side signal processing unit has an M3UA (MTP3—User Adaptation Layer) function to send a signal to an MGC via the IP network by using an SCTP (Stream Control Transmission Protocol).

The MSG management unit has a function to manage states of MGCs and to send a message requiring a line close operation to an exchange of the SCN when a fault occurs on an MGC side. To require the line close operation, a line state management function is also required. However, the SG originally does not have the line state management function, therefore, a part of a function ISUP (ISDN User Part) is added to the SG.

Each of the plurality of MGCs has a function of the M3UA and a function of the ISUP, to terminate an ISUP signal. Also, the plurality of MGCs perform line state management and controlling of MG to control calls and a connection of the IP network.

A media data stream is transferred between the plurality of MGs which are connected to the plurality of MGCs and an exchange of the SCN, via a bundle of communication lines. State of the communication lines are managed by the MGCs through the MGs. A line close signal of the bundle of communication lines (BLO (Blocking Message)/CGB (Circuit Group Blocking Message)) is issued by the MGCs, and sent to the exchange.

In a conventional method, when a fault occurs on an MGC side, a control signal of a bundle of communication lines sent from an exchange is discarded to, as a result occur a call loss, or an SG (or PC) cannot be accessed according to a function of the SG, consequently it is also impossible to use a bundle of communication lines controlled by an MGC which is not in trouble.

However, since the SG can send the line close signal (BLO/CGB) by using an MGC management unit when a fault occurs on the MGC side, the SG sends the line close signal (BLO/CGB) of a bundle of communication lines to the exchange at the time. Thereby, the exchange makes only a bundle of communication lines related to the MGC having a fault unavailable. As a result, it is capable of using a bundle of communication lines related to the other MGCs which are not in trouble.

As described above, according to the invention, the PC is not assigned to MGCs and is assigned to only a SG. Thereby, when a fault occurs on an MGC side, the SG requires a line close operation to prevent an occurrence of a call loss and an inaccessibility of the SG.

BRIEF DESCRIPTION OF THE DRAWINGS

FIG. 6 shows an example of a MGC state table shown in FIG. 5;

DESCRIPTION OF THE PREFERRED EMBODIMENT

Figure 1:
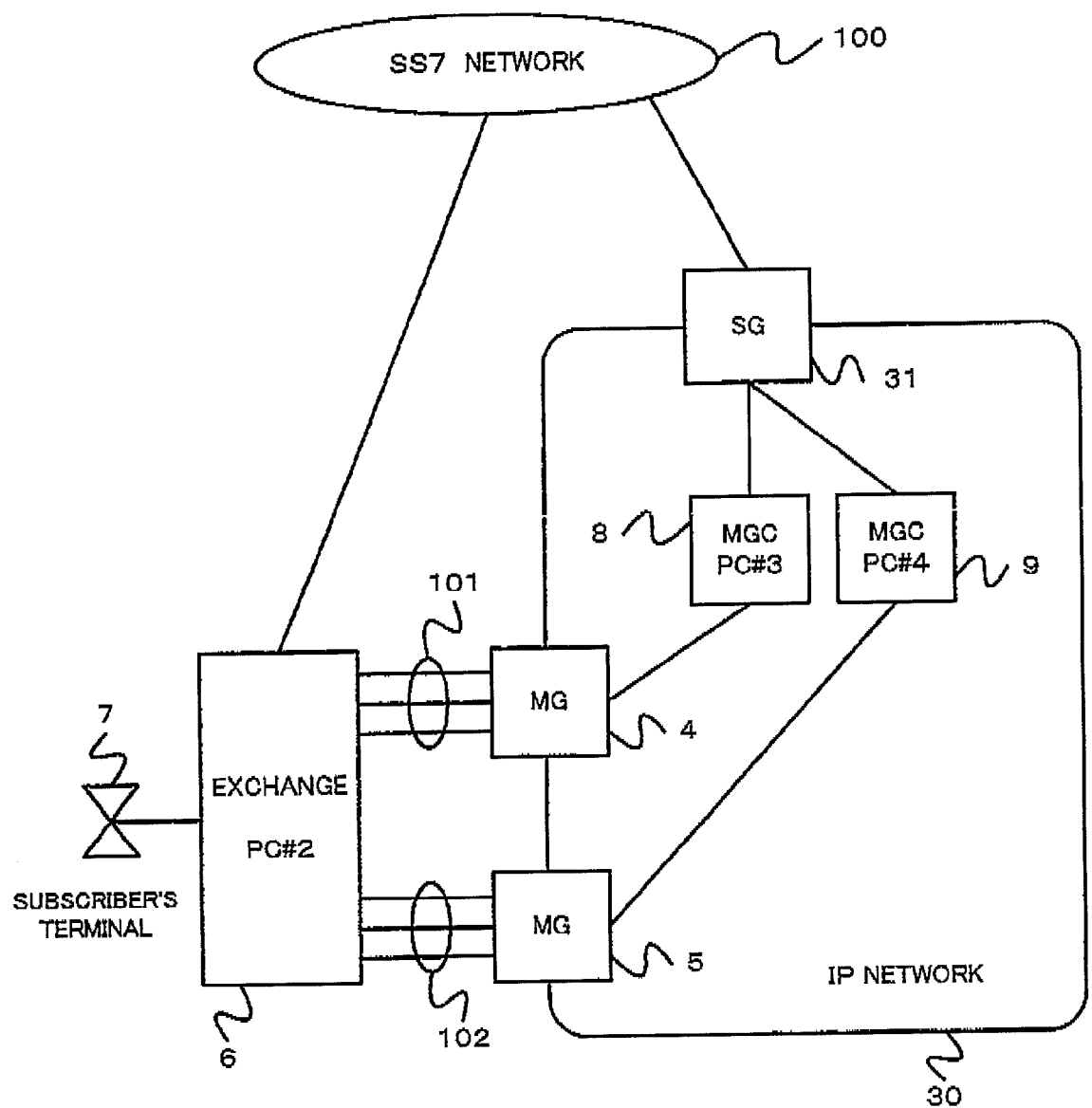
FIG. 1 shows a block diagram representing a structure of a conventional gateway system.
Figure 2:
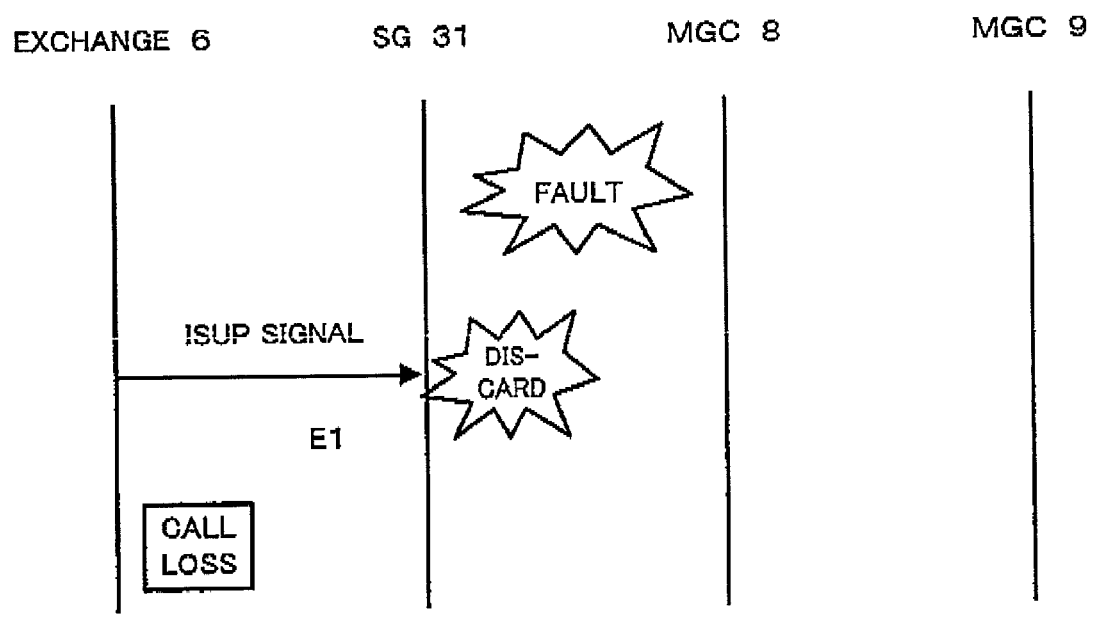
FIG. 2 shows a sequence chart representing an operation of the conventional gateway system shown in FIG. 1 when a fault occurs.
Figure 3:
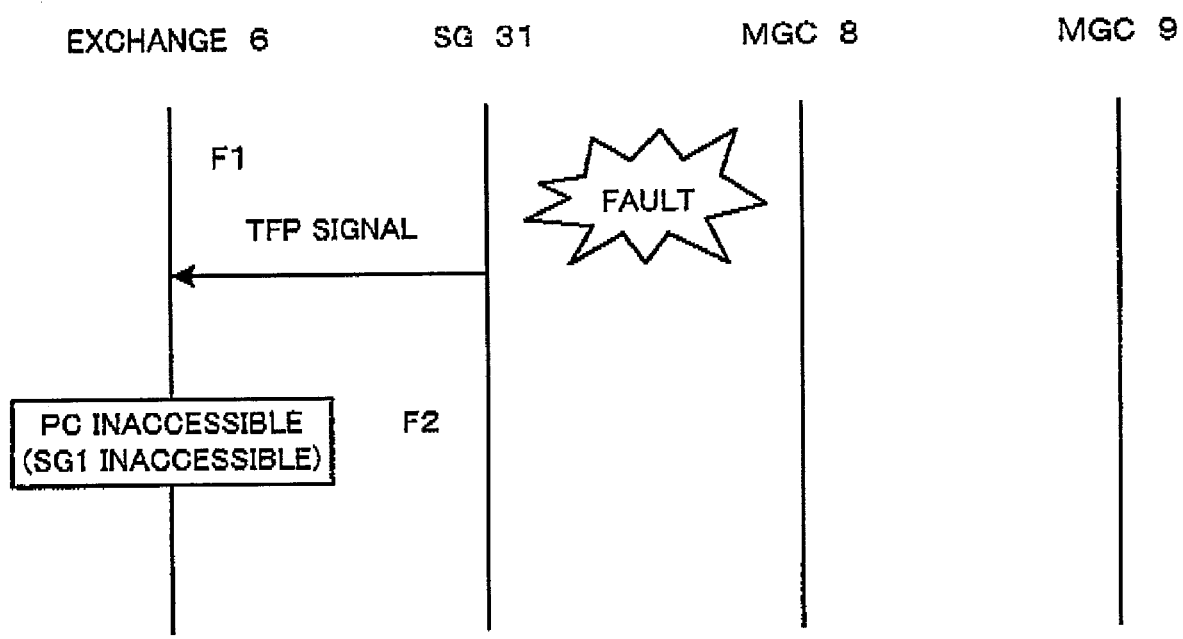
FIG. 3 shows a sequence chart representing another operation of the conventional gateway system shown in FIG. 1 when a fault occurs.

First, description is made about the above mentioned conventional gateway system with reference to FIGS. 1 to 3.

As shown in FIG. 1, the conventional gateway system includes an SG (Signaling Gateway) 31, MGCs 8 and 9, MGs (Media Gateway) 4 and 5, and an exchange 6.

The SG 31 is connected to an SS7 (Signaling System No. 7 (No. 7 common channel signaling)) network 100 via a signal link, and a No. 7 signal is transferred between the SG 31 and the exchange 6 of the SCN.

Also, the SG 31 is connected to the MGCs 8, 9 via an IP network 30, and a signal is transferred between the SG 31 and the MGCs 8, 9. The MGCs 8 and 9 are connected to the MGs 4 and 5 via the IP network 30, respectively. PC#3 is assigned to the MGC 8 and PC#4 is assigned to the MGC 9.

The exchange 6 is connected to the MGs 4 and 5 via bundles of communication lines 101 and 102. A plurality of subscriber's terminals 7 of users are connected to the exchange 6. When one of the users requires an IP network service, an available communication line of the bundles 101 and 102 is used.

Sequences of processes are shown in FIGS. 2 and 3 when the call loss occurs or the SG becomes inaccessible. In FIG. 2, a sequence is shown when the call loss occurs. When a fault (a trouble) occurs on the MGC 8 side (including input/output lines connected to the MGC 8), a line close signal is not sent to the exchange of the SCN.

Then, the exchange 6 determines that the bundle of communication lines 101 connected to the MG 4 which is controlled by the MGC 8 is available, and sends to the SG 31 an ISUP (ISDN (Integrated Service Digital Network) User Part) signal which controls the bundle of communication lines 101 (E1 in FIG. 2).

However, the SG 31 discards the ISUP signal (E1 in FIG. 2) since the SG 31 holds information representing that the fault occurs on the MGC side. Therefore, the exchange 6 cannot receive a response of the ISUP signal, then a timer of the exchange 6 determines that an established time expires and thereby a call loss occurs.

In FIG. 3, a sequence is shown when the SG 31 becomes inaccessible. When a fault occurs on the MGC side, the SG 31 sends to the SCN a TFP (TransFer Prohibited) signal which is a signal network management signal of a MTP (Message Transfer Part).

For example, a fault occurs on the MGC 8 side, the SG 31 sends the TFP signal to the exchange 6 (F1 in FIG. 3). In response to the signal, the exchange 6 disables accessing the SG 31 (F2 in FIG. 3). As a result, a bundle of communication lines 102 also becomes unavailable although the bundle 102 is controlled by the MGC which has no fault (trouble) at present.

Figure 4:
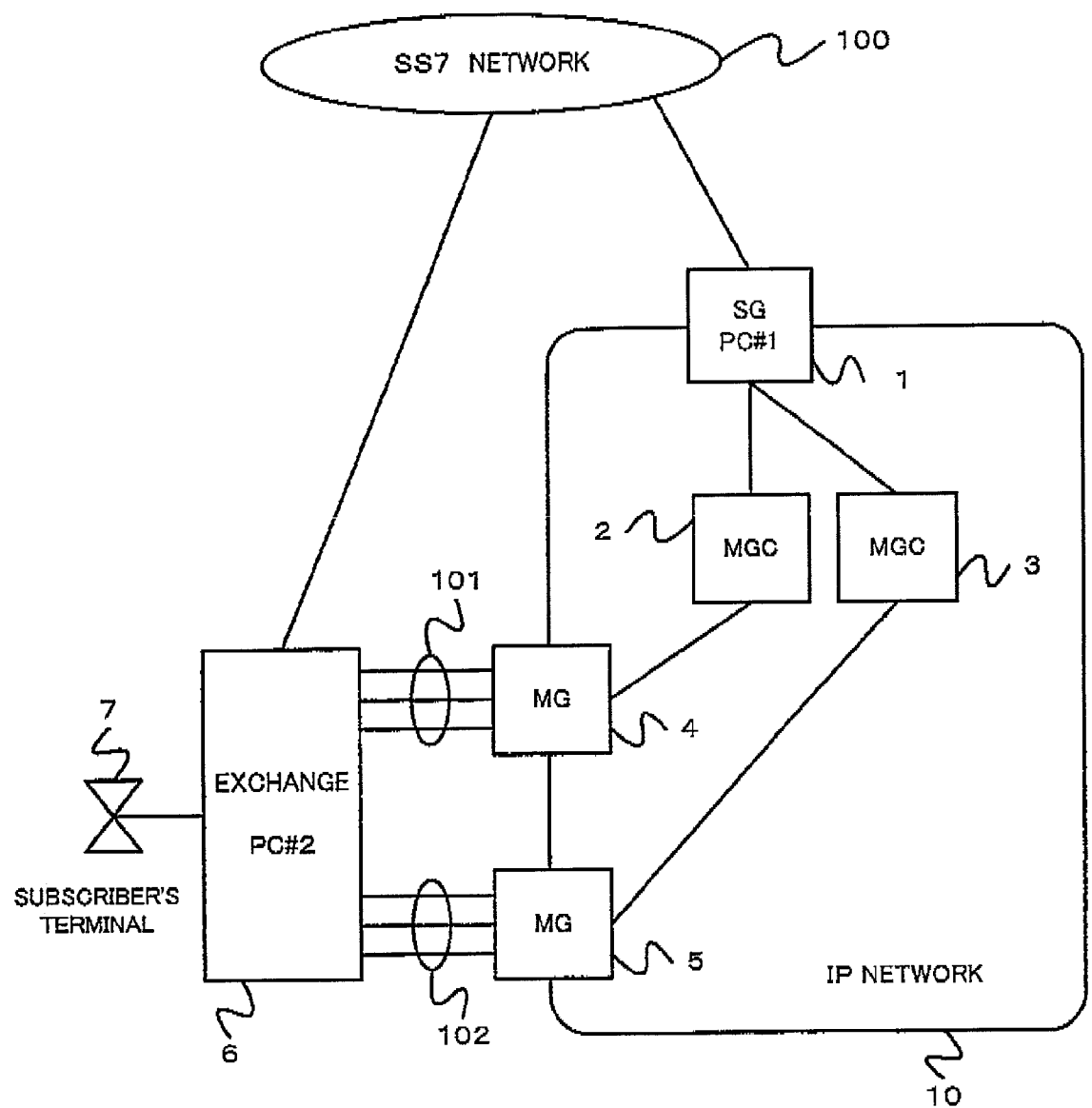
FIG. 4 shows a block diagram representing a structure of an embodiment of a gateway system according to the invention.

Next, description is made about an embodiment of the invention with reference to FIG. 4. As shown in FIG. 41 a gateway system according to the embodiment of the invention includes an SG (Signaling Gateway) 1, MGCs (Media Gateway Controller) 2 and 3, MGs (Media Gateway) 4 and 5, and an exchange 6, and provides an IP network service via an SCN (Switched Circuit Network) by using the elements.

A PC (Point Code) "PC#1" is assigned to the SG 1. The SG 1 is connected to an SS7 (Signaling System No. 7:No. 7 common channel signaling) network 100 via a signal link and a No. 7 signal is transferred between the SG1 and the exchange 6 of the SCN.

Also, the SG 1 is connected to the MGCs 2 and 3 via an IP (Internet Protocol) network 10 and a signal is transferred between them.

A PC is not assigned to the MGCs 2 and 3. The MGCs 2 and 3 are connected to the MGs 4 and 5, respectively, via the IP network 10 and a signal is transferred between them.

The exchange 6 is connected to the MG 4 via a bundle of communication lines 101, and is also connected to the MG 5 via a bundle of communication lines 102. Subscribers terminals 7 are connected to the exchange 6. When a user requires an IP network service by using one of the terminals 7, an available line is selected from the bundles 101 and 102, and the selected line is established as a communication line.

Figure 5:
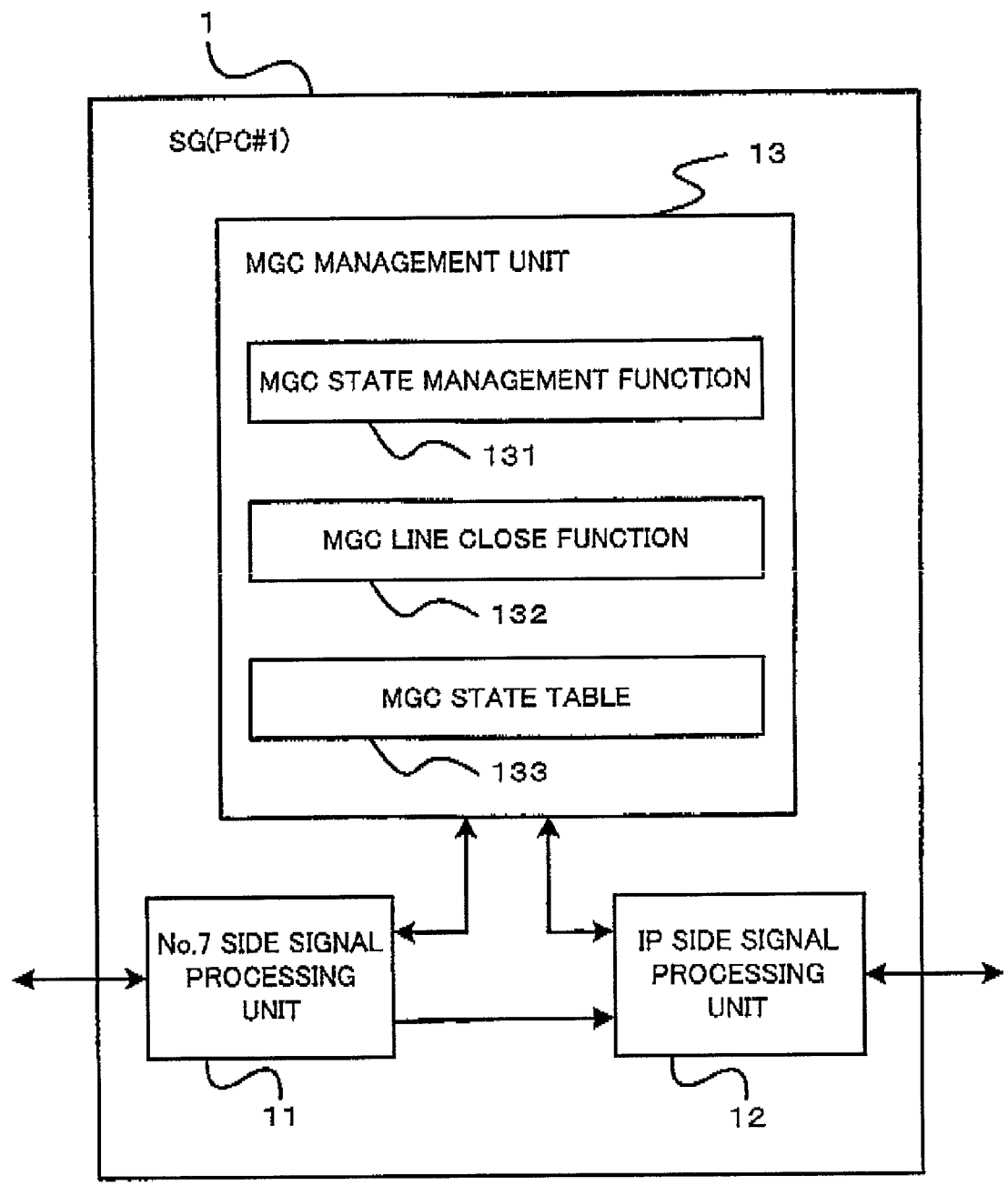
FIG. 5 shows a block diagram representing a structure of an SG shown in FIG. 4.

FIG. 5 shows a block diagram representing a structure of the SG 1 shown in FIG. 4. As shown in FIG. 5, the SG 1 includes a No. 7 side signal processing unit 11, an IP side signal processing unit 12, and an MGC management unit 13.

The No. 7 side signal processing unit 11 has a function of MTP-L3 (Message Transfer Part-Level 3), and transfers a No. 7 signal between the unit 11 and the SS7 network.

Also, the No. 7 side signal processing unit 11 has a function to get a CIC (Circuit Identification Code) in an ISUP message, which is a MTP-L3 user message. The No. 7 side signal processing unit 11 transforms the received No. 7 signal into a proper signal and sends the transformed signal to the IP side signal processing unit 12.

The IP side signal processing unit 12 has a function of M3UA (MTP (Message Transfer Part) 3—User Adaptation layer), and sends the signal received from the No. 7 side signal processing unit 11 to the MGCs 2 and 3 via the IP network 10 by using SCTP (Stream Control Transmission Protocol).

The MGC management unit 13 includes an MGC state management function 131, an MGC line close function 132, and an MGC state table 133. The MGC state management function 131 manages states of the MGCs 2 and 3. The MGC line close function 132 has a part of function of ISUP, and sends a line close signal (BLO/CGB:BLOcking message/Circuit Group Blocking message) to the SS7 network 100 via the No. 7 side signal processing unit 11 when a fault occurs on the MGC side, for example, a fault occurs on a LAN or on the MGC itself.

Also, the SG 1 stores a relationship between a communication line and an MGC which controls the communication line, and distributes a signal to the MGCs 2 and 3 by identifying a communication line based on a DPC (Destination Point Code) and a CIC (Circuit Identification Code) and selecting the corresponding MGC.

In the embodiment of the invention, the DPC is a PC "PC#2" of the exchange 6, and the CIC represents a communication line selected from the bundles of communication lines 101 and 102.

The MGCs 2 and 3 has a function of M3UA and a function of ISUP. The MGCs 2 and 3 can identify a communication line established between the exchange 6 and the MGs 4 and 5 from the DPC and the CIC. The MGCs 2 and 3 further manage states of lines and control the MGs 4 and 5 to control calls and connections of the IP network 10.

FIG. 6 shows an example of the MGC state table 133 shown in FIG. 5. In FIG. 6, only a part which is related to the embodiment of the invention is shown. That is, in the MGC state table 133, MGC fault information and line close information are stored for each MGC.

The MGC fault information represents whether a fault occurs on the MGC side or not. If the fault occurs on the MGC side, a value of "1" is set to the MGC fault information, otherwise, a value of "0" is set to the MGC fault information. Also, the line close information represents whether a line close operation is performed or not when a fault occurs on the MGC side. If the line close operation is performed, a value of "1" is set to the line close information, otherwise, a value of "0" is set to the line close information.

Figure 7:
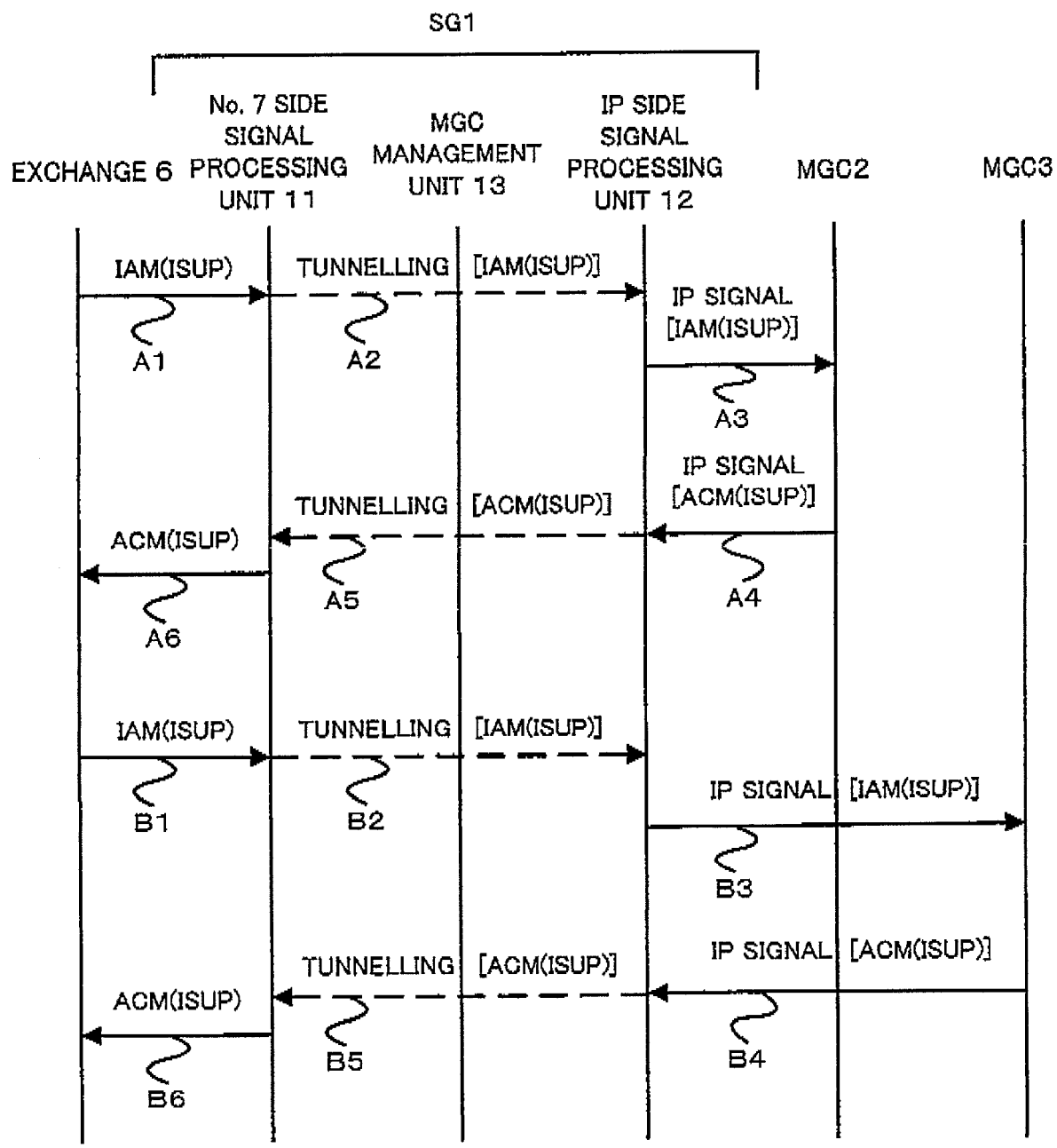
FIG. 7 shows a sequence chart representing a normal operation of the gateway system.
Figure 8:
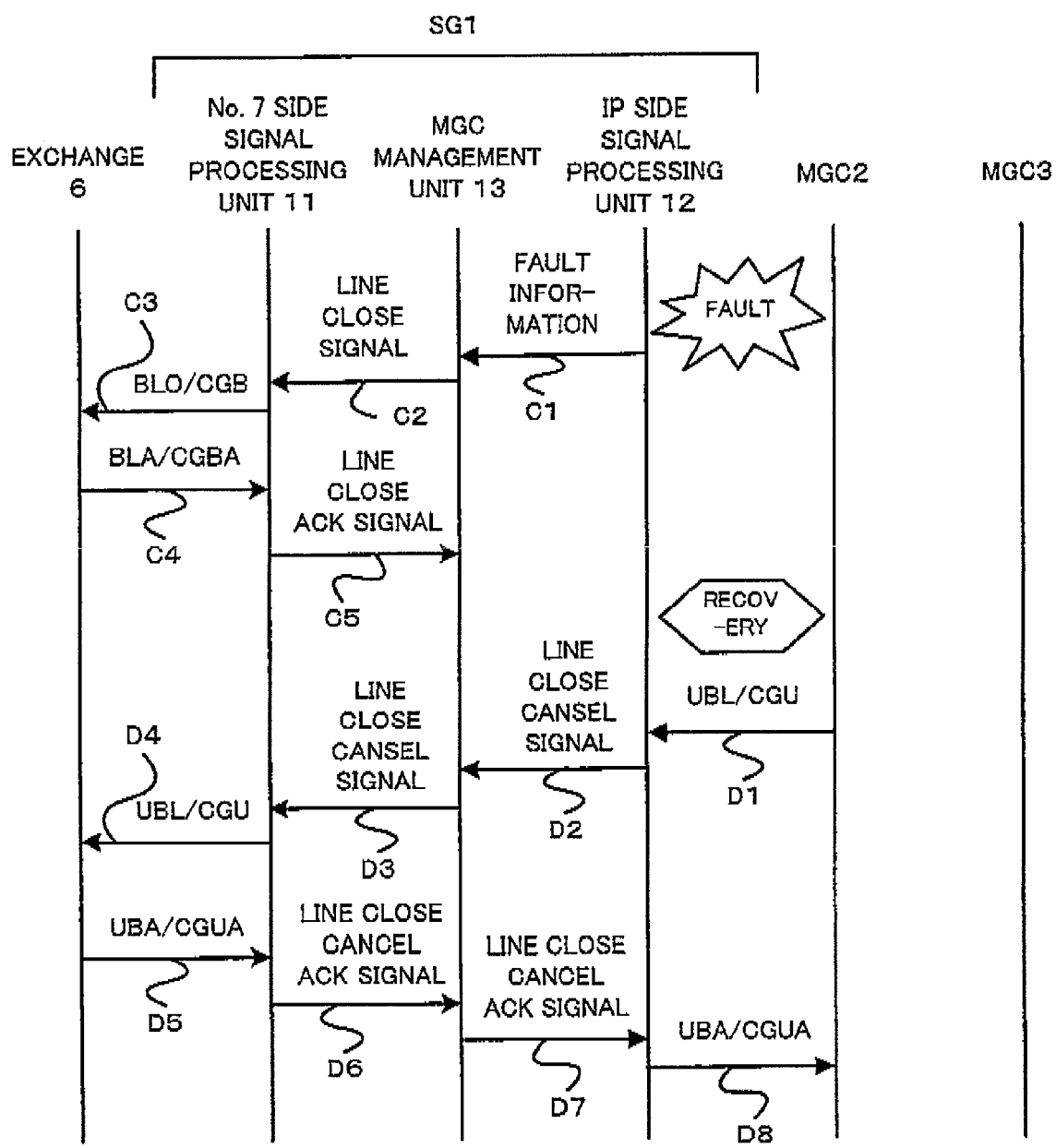
FIG. 8 shows a sequence chart representing an operation of the gateway system when a fault occurs.

FIG. 7 shows a sequence chart when the gateway system according to the embodiment of the invention operates normally. FIG. 8 shows a sequence chart of the gateway system according to the embodiment of the invention when a fault occurs.

Figure 9:
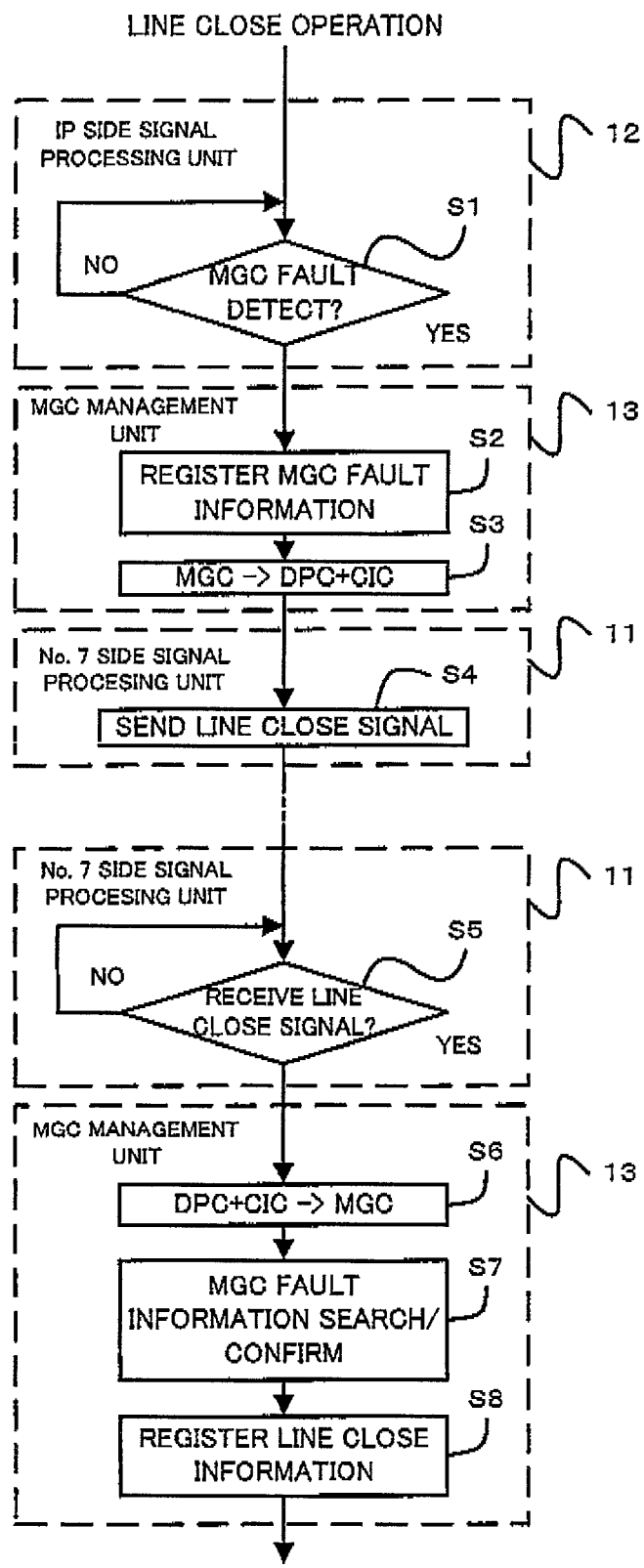
FIG. 9 shows a flowchart of a line close operation by the SG shown in FIG. 5.
Figure 10:
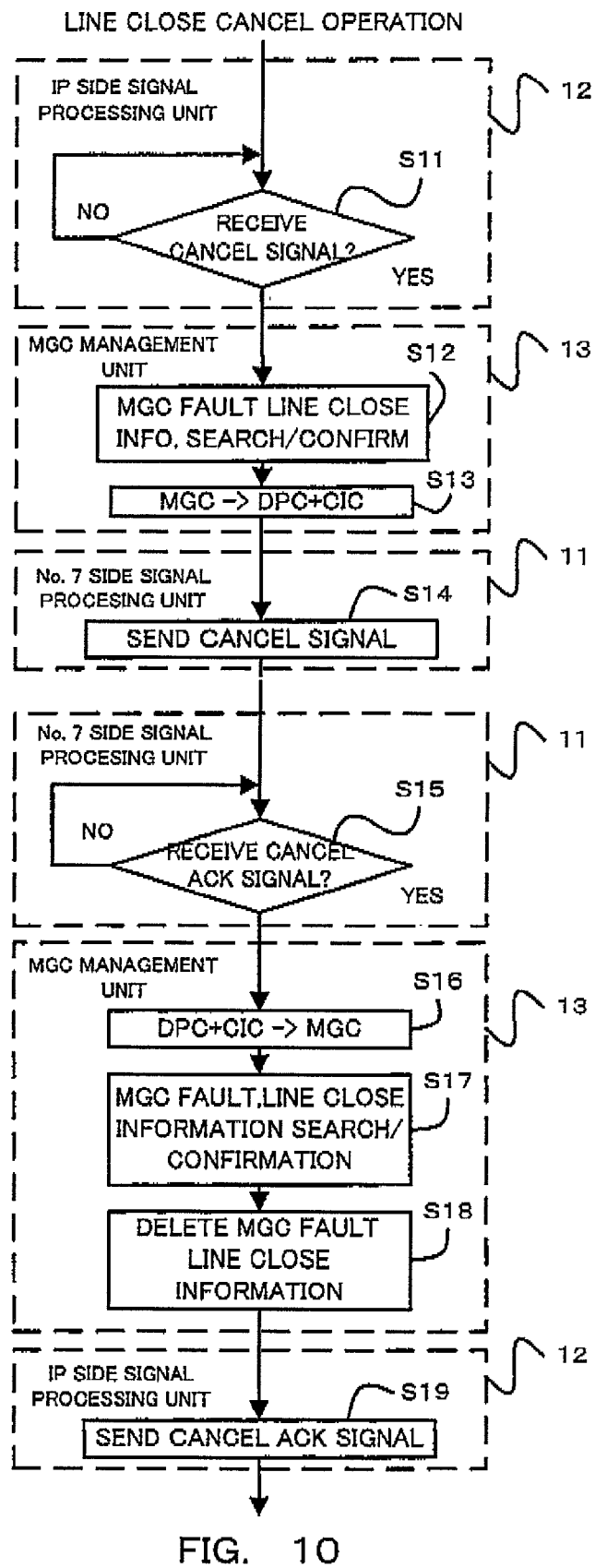
FIG. 10 shows a flowchart of a line close cancel operation by the SG shown in FIG. 5.

Also, FIG. 9 shows a flowchart representing a line close operation performed by the SG 1 shown in FIG. 5. FIG. 10 shows a flowchart representing a line close cancel operation performed by the SG 1 shown in FIG. 5.

Then, description is made about operations of the gateway system according to the embodiment of the invention with reference to FIGS. 7 to 10.

First, description is made about a normal operation case. In the gateway system, an IAM (Initial Address Message) (ISUP) is sent to the SG 1 by the exchange 6, via the SS7 network 100 (A1 in FIG. 7).

When the SG 1 receives the IAM, the SG 1 identifies a communication line based on a DPC and a CIC of an ISUP signal, and passes the IAM (ISUP) to the IP side signal processing unit 12 by using tunneling (A2 in FIG. 7). The function of M3UA of the IP side signal processing unit 12 distributes an IP signal (IAM (ISUP))to the MGC 2 (A3 in FIG. 7) by using an SCTP. In this embodiment, it is assumed that a communication line of the bundle of communication lines 101 is used, consequently, the MGC 2 is selected as a destination of the IP signal.

The MGC 2 controls the MG 4 according to contents of the IP signal, and returns the IP signal (ACM (Address Complete Message))(ISUP) to the SG 1 (A4 in FIG. 7). The IP side signal processing unit 12 of the SG 1 passes the ACM (ISUP) to the No. 7 side signal processing unit 11 by tunneling (A5 in FIG. 7), and the No. 7 side signal processing unit 11 sends the ACM (ISUP) to the exchange 6 via the SS7 network 100 (A6 in FIG. 7).

When a line of the bundle of communication lines 102 is used as a communication line, each signal (B1 to B6 in FIG. 7) is transferred between the exchange 6 and the MGC 3 via the SG 1 according to a similar sequence described above.

Next, description is made about operations when a fault occurs on the MGC 2 side. When a fault occurs on the MGC 2, a fault information signal is sent from the IP side signal processing unit 12 to the MGC management unit 13 (C1 in FIG. 8), and thereby fault information is transferred. The MGC management unit 13 sends a line close signal of the bundle of communication lines 101 which is controlled by the MGC 2, to the No. 7 side signal processing unit 11 (C2 in FIG. 8). Then, the No. 7 side signal processing unit 11 sends the line close signal (BLO/CGB) to the exchange 6 via the SS7 network 100 (C3 in FIG. 8).

When the exchange 8 receives the line close signal (C3 in FIG. 8), the exchange 6 closes all lines of the bundle 101 and sends a line close acknowledgement signal (BLA/CGBA: BLocking Acknowledgement message/Circuit Group Blocking Acknowledgement message) to the SG 1 via the SS7 network 100 (C4 in FIG. 8).

As a result, the bundle of communication lines 101 becomes unavailable, but since the bundle of communication lines 102 controlled by the MGC 3 remains available, the exchange 6 selects a line of the bundle 102, and sends a control signal to the SS7 network 100, consequently a call control is performed by using the SG 1, the MGC 3, and the MG 5.

Then, description is made about the above mentioned line close operation with reference to FIG. 9. When the IP side signal processing unit 12 of the SG 1 detects that a fault occurs on the MGC side by using a health check or the like (step S1 in FIG. 9), the MGC state management function 131 of the MGC management unit 13 registers the MGC fault information into the MGC state table 133 (step S2 in FIG. 9).

The MGC line close function 132 searches the MGC state table 133. When MGC fault information is registered in the table 133, but line close information is not registered in the table 133, the function 132 generates a line close signal to be sent to the MGC having a fault and transforms the MGC of the line close signal into a DPC and a CIC to send the signal to the MGC having a fault (step S3 in FIG. 9). Then, the No. 7 side signal processing unit 11 sends the transformed line close signal to the exchange 6 via the SS7 network (step S4 in FIG. 9).

After that, when the No. 7 side signal processing unit 11 of the SG 1 receives a line close acknowledgement signal from the exchange 6 via the SS7 network 100 (step S5 in FIG. 9), the MGC management unit 13 transforms the line close acknowledgement signal into an MG by using the DPC and the CIC (step S6 in FIG. 9). The MGC management unit 13 searches the MGC state table 133 for MGC fault information by using the transformed MGC, and confirms That the MGC is in trouble (step S7 in FIG. 9). Then, the unit 13 registers the line close information in an area, of the MGC state table 133, corresponding to the MGC (step S3 in FIG. 9).

Next, description is made about operations when the fault (trouble) of the MGC 2 is restored. When the fault of the MGC 2 is restored, a line close cancel signal (UBL/CGU: UnBlocking message/Circuit Group Unblocking message) or the like is sent from the MGC 2 to the SG 1 (D1 in FIG. 8).

The SG 1 sends the line close cancel signal or the like to the No. 7 side signal processing unit 11 via the IP side signal processing unit 12 and the MGC management unit 13 (D2 and D3 in FIG. 8). Then, the No. 7 side signal processing unit 11 sends the line close cancel signal (UBL/CGU) to the exchange 6 via the SS7 network 100 (D4 in FIG. 8).

When the exchange 6 receives the line close cancel signal, the exchange 6 cancels blocking of the bundle of communication lines 101, makes them available, and sends a line close cancel acknowledgement signal (UBA/CGUA:UnBlocking Acknowledgement message/Circuit Group Unblocking Acknowledgement message) to the SG 1 via the SS7 network 100 (D5 in FIG. 8).

Then, description is made about the above line close cancel operation with reference to FIG. 10. When the IP side signal processing unit 12 of the SG 1 receives the line close cancel signal from the MGC which recovers from the fault (step S11 in FIG. 10), the MGC management unit 13 searches the MGC state table 133 for MGC fault information and line close information based on the line close cancel signal, and confirms that the MGC falls into a line close state due to a fault (step S12 in FIG. 10). Then, the unit 13 transforms the MGC of the line close cancel signal into a DPC and a CIC (step S13 in FIG. 10). The No. 7 side signal processing unit 11 sends the transformed line close cancel signal to the exchange 6 via the SS7 network 100 (step S14 in FIG. 10).

After that, when the No. 7 side signal processing unit 11 of the SG 1 receives a line close cancel acknowledgement signal from the exchange 6 via the SS7 network 100 (step S15 in FIG. 10), the MGC management unit 13 transforms the DPC and the CIC of the line close cancel acknowledgement signal into the MGC (step S16 in FIG. 10). The MGC management unit 13 searches the MGC state table 133 for MGC fault information and line close information by using the MGC, and confirms that the MGC falls into a line close state due to a fault (step S17 in FIG. 10). Then, the unit 13 deletes the MGC fault information and the line close information from the MGC state table 133 (step S18 in FIG. 10). Then, the IP side signal processing unit 12 sends a line close cancel acknowledgement signal to the corresponding MGC (step S19 in FIG. 10).

As described above, in this embodiment, when a fault occurs on the MGC side, it is possible to prevent a call loss and an inaccessibility of the SG 1 by sending a line close signal (BLO/CGB) to a SCN side, consequently, communication lines are effectively used.

In this embodiment, although each MGC (2, 3) controls a single MG (4, 5), a single MGC (2, 3) can control a plurality of MGs since each MGC stores a pair of a communication line and an MG which controls the communication line. In this case, the MGC distributes a signal to an MG identified by using a DPC and a CIC.

Figure 11:
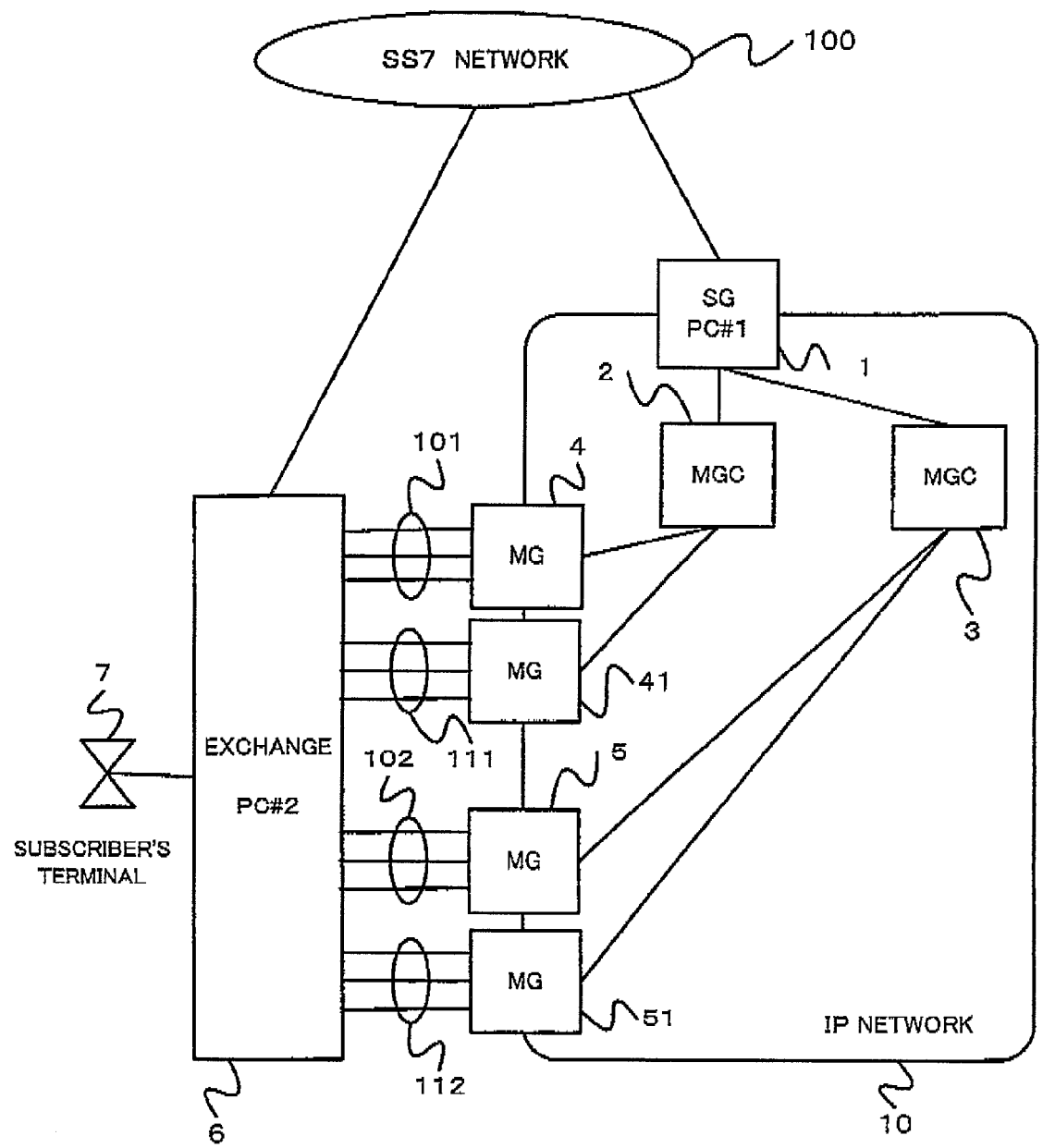
FIG. 11 shows a block diagram representing a structure of another embodiment of a gateway system according to the invention.

FIG. 11 shows a block diagram of a gateway system according to another embodiment of the invention. In the gateway system as shown in FIG. 11, each MGC (2, 3) is connected to a plurality of MGs (4 and 41, 5 and 51).

In this case, the MGC 2 distributes a signal to MGs 4 and 41 by using a DPC and CIC. Similarly, the MGC 3 distributes a signal to MGs 5 and 51 by using a DPC and a CIC. In the above configuration, when a fault occurs on the MG side, the MGCs 2 and 3 perform a management operation, and a line close signal is sent from the MGCs 2 and 3.

For example, when a fault occurs on the MG 41, the MGC 2 sends a line close signal of the bundle of communication lines 111 controlled by the MG 41, and SG 1 passes the signal to the exchange 6 of the SCN side.

Figure 12:
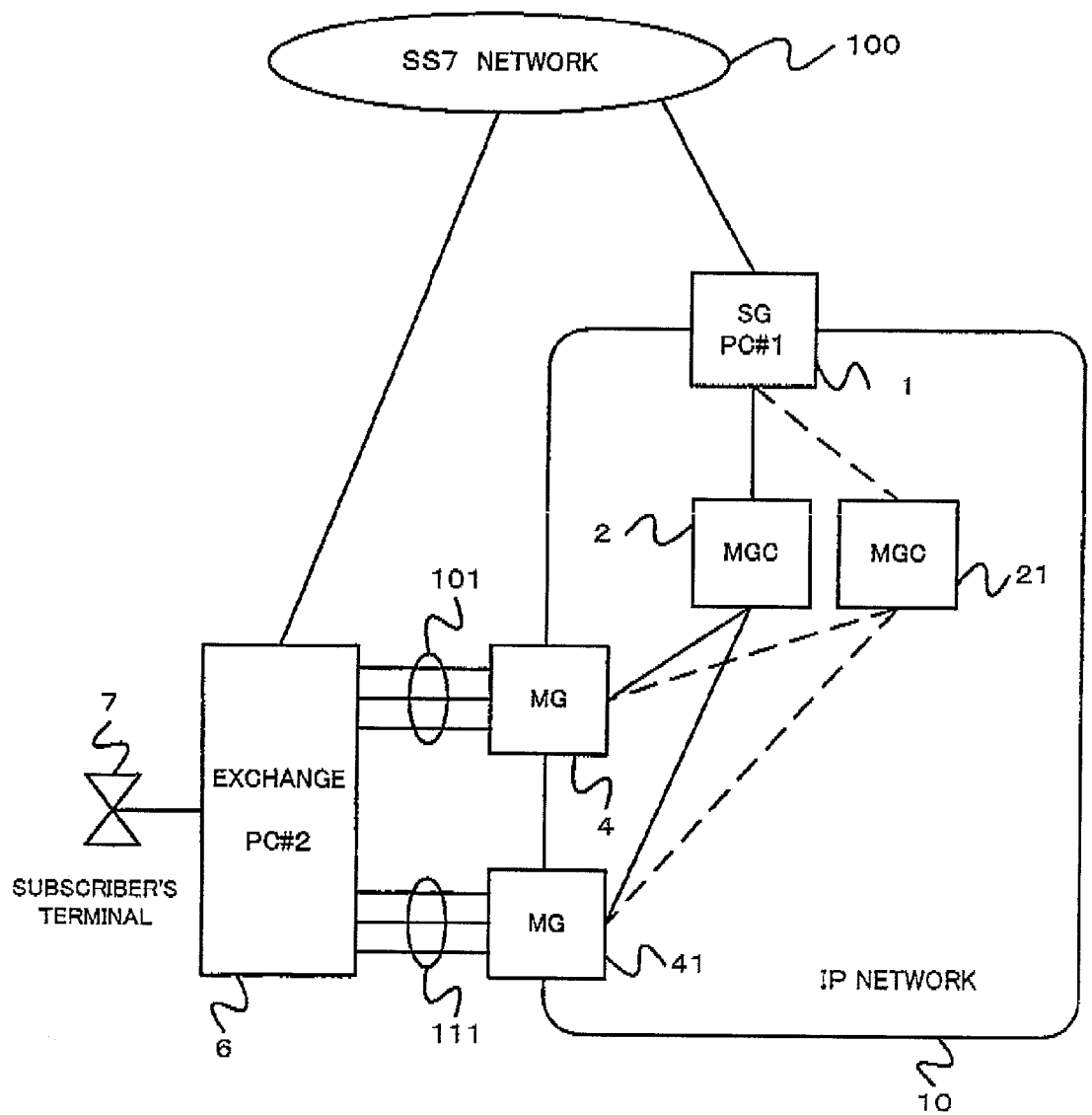
FIG. 12 shows a block diagram representing a structure of still another embodiment of a gateway system according to the invention.

FIG. 12 shows a block diagram of a gateway system according to another embodiment of the invention. In the gateway system as shown in FIG. 12, an MGC 21 is added and an IP address which is different from the IP address of the MGC 2 is assigned. Thereby, the MGCs are prepared in a dual configuration (ACT (active)/SBY (standby)).

Examples of configurations of gateway systems as shown in FIGS. 11 and 12 can easily manage MGCs 2, 3, and 21 by giving a PC only to the SG 1.

As described above, according to the invention, a gateway system which provides an IP network service via an existing switched circuit network is provided. The system comprises (1) a media gateway which performs transformation of a media format required between the switched circuit network and an IP network, (2) a plurality of media gateway controllers each of which controls the media gateway and controls calls and connections of the IP network, and (3) a signaling gateway which performs signaling transfer between the switched circuit network and the IP network. Wherein, when a fault occurs on a media gateway controller side, the signaling gateway has a function to require an opposed node (for example, the exchange 6 connected to the SCN) of the switched circuit network to perform a line close operation about lines controlled by the media gateway controller.

Further, the gateway system can prevent a call loss and an inaccessibility of a PC (a signaling gateway) even if a fault occurs on the media gateway controller side, by giving to the signaling gateway the PC which is used as a routing address of a signal message. As a result, the gateway system can effectively utilize communication lines.

What is claimed is:

1. A gateway system which provides an IP network service via an existing switched circuit network comprising:
   a media gateway which performs transformation of a media format required between the switched circuit network and an IP network;
   a plurality of media gateway controllers each of which controls the media gateway and controls calls and connections of the IP network; and
   a signaling gateway which performs signaling transfer between the switched circuit network and the IP network, wherein when a fault occurs on a media gateway controller side, the signaling gateway has a function to require an opposed node of the switched circuit network to perform a line close operation about lines controlled by the media gateway controller.

2. The gateway system of claim 1, wherein the IP network service includes a RAS or a VoIP.

3. The gateway system of claim 1, wherein a PC which is used as a routing address of a signal message is given to the signaling gateway and is not given to each of the plurality of the media gateway controllers.

4. The gateway system of claim 3, wherein the function to require the opposed node to perform the line close operation is realized by a part of function of ISUP.

5. The gateway system of claim 3, wherein the media gateway controller is configured to control one or more media gateway.

6. The gateway system of claim 5, wherein an IP address is assigned to each of the plurality of media gateway controllers and the IP addresses are different from each other, and each of the plurality of media gateway controllers is configured to the same media gateway.

7. A fault management method of a gateway system which provides an IP network service via an existing switched circuit network comprising the steps of:
   performing, at a media gateway, transformation of a media format required between the switched circuit network and an IP network;
   controlling, at each of a plurality of media gateway controllers, the media gateway, and calls and connections of the IP network;
   performing, at a signaling gateway, signaling transfer between the switched circuit network and the IP network; and
   requiring, at the signaling gateway, when a fault occurs on a media gateway controller side, an opposed node of the switched circuit network to perform a line close operation about lines controlled by the media gateway controller.

8. The method of claim 7, wherein the IP network service includes a RAS or a VoIP.

9. The method of claim 7, wherein a PC which is used as a routing address of a signal message is given to the signaling gateway and is not given to each of the plurality of the media gateway controllers.

10. The method of claim 9, wherein the step of requiring is realized by a part of function of ISUP.

11. The method of claim 9, wherein the media gateway controller is configured to control one or more media gateway.

12. The method of claim 7, wherein an IP address is assigned to each of the plurality of media gateway controllers and the IP addresses are different from each other, and each of the plurality of media gateway controllers is configured to the same media gateway.

13. A recording medium readable by a computer, tangibly embodying a program of instructions executable by the computer to perform a fault management method of a gateway system which provides an IP network service via an existing switched circuit network comprising the steps of:
   performing, at a media gateway, transformation of a media format required between the switched circuit network and an IP network;
   controlling, at each of a plurality of media gateway controllers, the media gateway, and calls and connections of the IP network;
   performing, at a signaling gateway, signaling transfer between the switched circuit network and the IP network; and
   requiring, at the signaling gateway, when a fault occurs on a media gateway controller side, an opposed node of the switched circuit network to perform a line close operation about lines controlled by the media gateway controller.

14. A computer data signal embodied in a carrier wave and representing a sequence of instructions which, when executed by a processor, cause the processor to perform a fault management method of a gateway system which provides an IP network service via an existing switched circuit network comprising the steps of:
   performing, at a media gateway, transformation of a media format required between the switched circuit network and an IP network;
   controlling, at each of a plurality of media gateway controllers, the media gateway, and calls and connections of the IP network;
   performing, at a signaling gateway, signaling transfer between the switched circuit network and the IP network; and
   requiring, at the signaling gateway, when a fault occurs on a media gateway controller side, an opposed node of the switched circuit network to perform a line close operation about lines controlled by the media gateway controller.

15. A program product comprising, computer readable instructions and a recording medium bearing the computer readable instructions, the instructions being adaptable to enable a computer to perform a fault management method of a gateway system which provides an IP network service via an existing switched circuit network comprising the steps of:
   performing, at a media gateway, transformation of a media format required between the switched circuit network and an IP network;
   controlling, at each of a plurality of media gateway controllers, the media gateway, and calls and connections of the IP network;
   performing, at a signaling gateway, signaling transfer between the switched circuit network and the IP network; and
   requiring, at the signaling gateway, when a fault occurs on a media gateway controller side, an opposed node of the switched circuit network to perform a line close operation about lines controlled by the media gateway controller.

* * * * *